United States Patent [19]
Günther

[11] Patent Number: 5,109,960
[45] Date of Patent: May 5, 1992

[54] BRAKE DISK FOR DISK BRAKES

[75] Inventor: Schwarz Günther, Tuttlingen, Fed. Rep. of Germany

[73] Assignee: Schwäbische Hüttenwerke Gesellschaft mit beschränkter Haftung (GmbH), Aalen-Wasseralfingen, Fed. Rep. of Germany

[21] Appl. No.: 539,938

[22] Filed: Jun. 19, 1990

[30] Foreign Application Priority Data

Jun. 22, 1989 [DE] Fed. Rep. of Germany ....... 3920418

[51] Int. Cl.⁵ .............................................. F16D 65/12
[52] U.S. Cl. ............................................. 188/218 XL
[58] Field of Search .... 188/218 XL, 264 A, 264 AA, 188/73.1

[56] References Cited

U.S. PATENT DOCUMENTS

| | | | |
|---|---|---|---|
| 2,412,432 | 12/1946 | Tack | 188/218 XL |
| 2,603,316 | 7/1952 | Pierce | 188/264 A |
| 4,281,745 | 8/1981 | Wirth | 188/218 XL |

FOREIGN PATENT DOCUMENTS 2557649  10/1985  Fed. Rep. of Germany .

Primary Examiner—Robert J. Oberleitner
Assistant Examiner—Peter M. Poon
Attorney, Agent, or Firm—Foley & Lardner

[57] ABSTRACT

The brake disk according to the invention has on the nave a supporting ring with radial depressions. Parts of the disk rim engage in a limited radially displaceable way in these depressions, but are mounted with a form fit in the direction of torque. The nave consists of material of higher tensile strength than the material of the disk rim, and the disk rim is fixed on the nave by composite casting. Different coefficients of expansion are thereby accommodated.

14 Claims, 2 Drawing Sheets

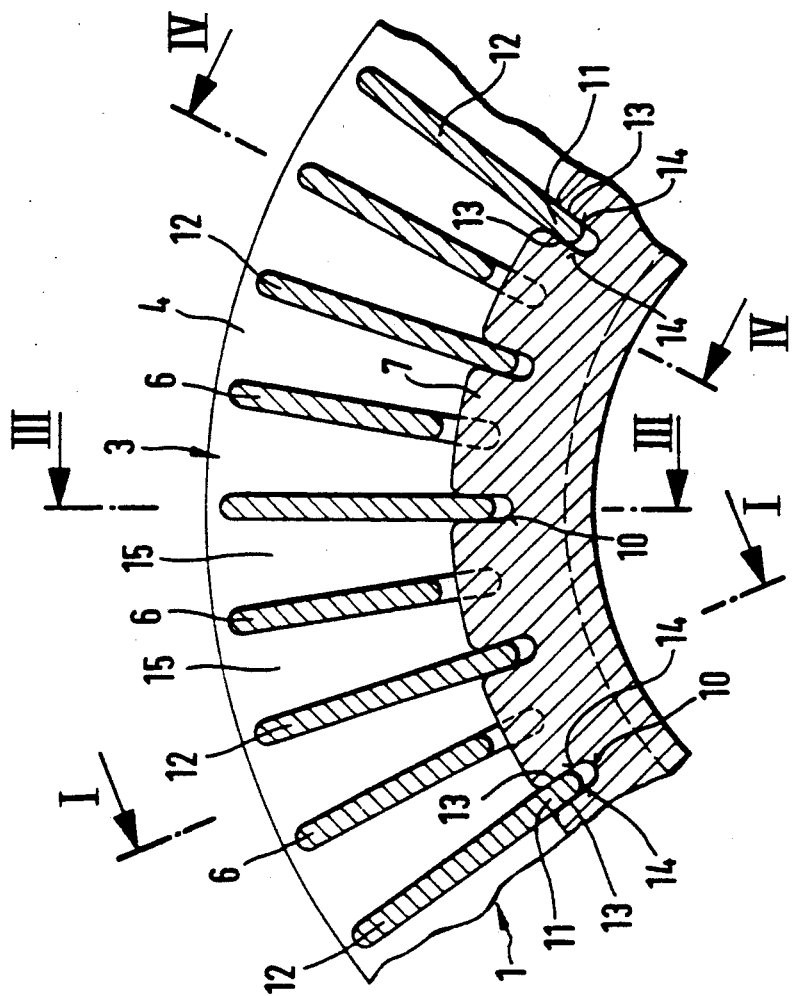
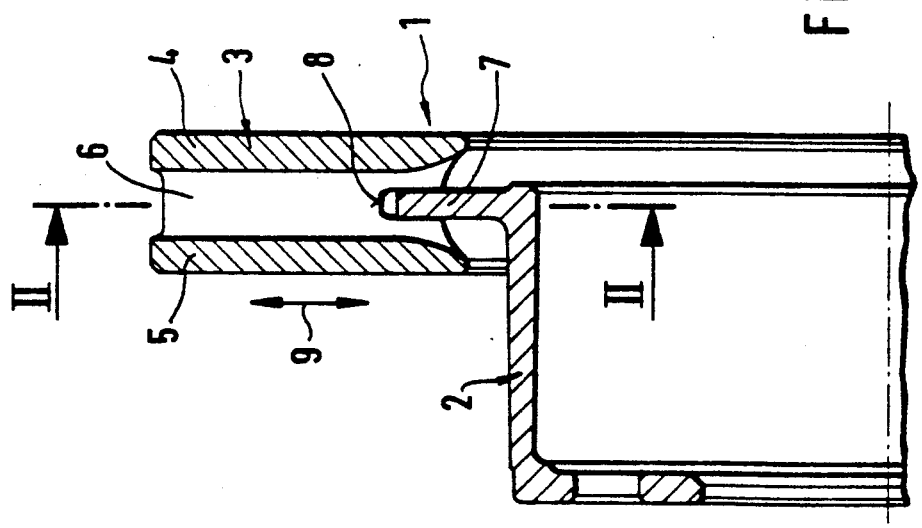
Fig. 2
Fig. 1

BRAKE DISK FOR DISK BRAKES

BACKGROUND OF THE INVENTION

The invention relates to a brake disk for disk brakes of the type having a disk rim with at least one friction ring, and having particularly advantageous use in motor vehicles.

Such a brake disk is generally known, for example, from German Patent Specification 2,557,649. In this known brake disk, the nave and the friction disk are produced as separate cast parts. The brake disk is mounted on the nave by a plurality of ribs, which extend into corresponding depressions of the nave. The friction disk is fixed on the radially outer-lying ends of the ribs by a form fit. In order that the ribs do not have to be inserted individually, it has been proposed to connect the ribs to one another as a ring of ribs.

SUMMARY OF THE INVENTION

It is an object of the present invention to provide a brake disk of the general type described which corresponds better to the different stressing of the nave and of the disk rim; which can be produced in a simple way, and which, in addition, offers a segregation with regard to different coefficients of expansion.

This object is achieved in the case of a brake disk constructed in accordance with the present invention by providing the nave with a supporting ring having radial depressions into which parts of the disk rim engage in a limited radially displaceable manner and with a form fit in the direction of torque. The nave preferably consists of a material of higher tensile strength than the material of the disk rim, which is fixed on the nave by means of composite casting.

The essential advantages of the invention are to be seen in that the nave, which should be dimensionally stable even when subjected to great mechanical and thermal loading, consists of a material of high tensile strength. In comparison, the disk rim is produced from a material of lower tensile strength, since such cast materials of lower tensile strength have a relatively large content of free graphite and, as a result, are thermally resistant to hot cracks and stresses. The lower tensile strength in the disk rim is compensated again by the high tensile strength of the nave, in particular by production in composite casting. The different temperatures to which the disk rim and supporting ring are subjected, and the different coefficients of expansion of the cast materials do not lead to material stresses in the joining area, since there is a limited displaceability in the radial direction.

Due to composite casting, the brake disk can be produced in a simple way, since the inner part, cast from a high-strength material, is placed on an inserted core for casting of the disk. The mold is then filled with the material for the disk rim, the material of the disk rim not only getting into lateral regions of the supporting ring but also into the radial depressions.

According to a preferred development of the invention, the brake disk comprises, in a way known per se, two friction rings, which are connected via a plurality of webs running in an axial direction, at least some of these webs having on their radially inner lying ends sections which engage in the radial depressions, designed as grooves, of the supporting ring. Such a disk ring offers the possibility of using the webs, which are there in any case, for torque transmission.

In order that so-called reversing noises cannot occur when changing from forward travel to reverse travel, and vice versa, it is expedient that the axially running surfaces of the sections bear without any clearance in the direction of torque against wall parts of the grooves and are mounted radially movably in relation to the latter. In this way, the radial mobility is ensured, but chattering noises when reversing the direction of travel due to metal parts knocking against one another do not occur.

The number of ribs which engage in the depressions formed in the supporting ring, and which are consequently involved in the torque transmission, may be determined according to the requirements made on the brake disk. Twenty ribs which are arranged evenly distributed over the circular circumference have proved to be a good number. In a further development, an additional web, the radially inner end of which lies outside the supporting ring, is provided in each case between two neighboring webs which engage in the supporting ring. Due to these additional webs, on the one hand the strength of the disk rim is increased, and on the other hand these webs act as additional vanes for conveying cooling air in the channels formed between the friction rings and webs.

In order to ensure the freedom to compensate for the different expansions in the radial direction, it is of advantage that the opposite surfaces of the disk rim and of the supporting ring have a spacing of about 3 mm in the radial direction. It is also expedient to fix the disk rim on the supporting ring without any clearance in the axial direction, which is achieved in a simple way by the axial fixing means being formed by sections of the webs of the disk rim laterally flanking the supporting ring.

Gray cast iron of a tensile strength of at least 250 $N/mm^2$ (GG 25) or gray cast iron of a tensile strength of 300 $N/mm^2$ (GG 30) has proved to be a particularly suitable material for the nave. For particularly high stresses, the nave may also consist of gray cast iron with spheroidal graphite of a tensile strength of at least 400 $N/mm^2$ (GGG 40). The nave preferably consists of a steel of suitable grade, which can be transformed into the necessary shape by deep drawing, flow forming or similar forming operations. Sintered steel which is formed in a suitable powder-metallurgical process is in particular advantageous as a material for the nave. For the disk rim, which in particular is exposed to great thermal loading due to the interaction with the friction lings, the material preferably comprises a gray cast iron having a high carbon content. Therefore, gray cast iron of a tensile strength of 100 or 150 $N/mm^2$ (GG 10 or GG 15) is proposed as a material for the disk rim.

BRIEF DESCRIPTION OF THE DRAWINGS

The brake disk for disk brakes according to the invention is explained in further detail below with reference to the drawings, in which:

FIG. 1 comprises a radial section through a first embodiment of the brake disk,

FIG. 2 comprises a section along the line II—II in FIG. 1,

DETAILED DESCRIPTION OF THE PREFERRED EMBODIMENTS

Figure 3:
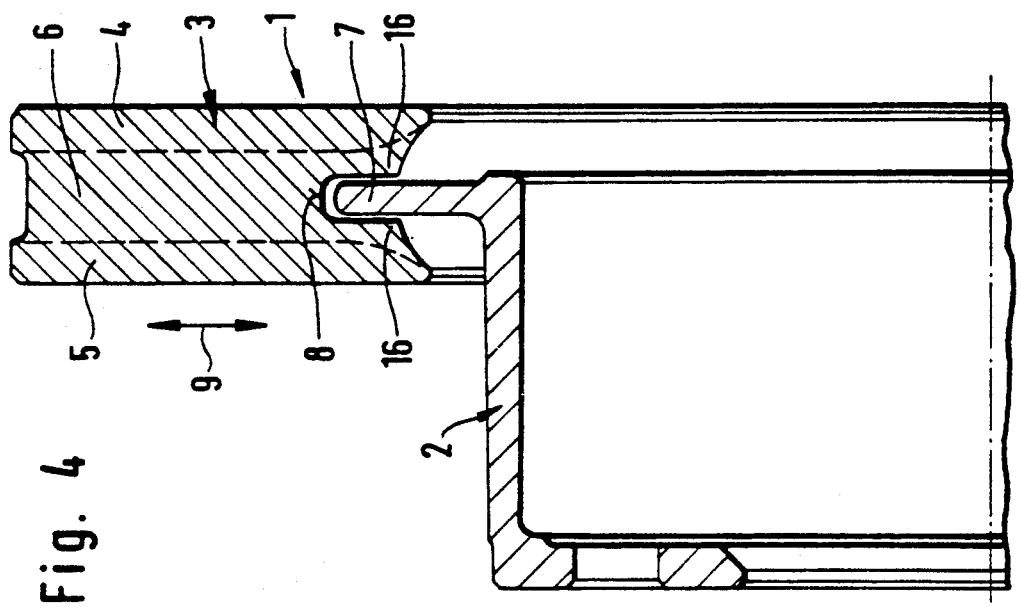
FIG. 3 comprises a section along the line III—III in FIG. 2.

In FIG. 1, a brake disk 1, which consists of a nave 2 and a disk rim 3 fixed thereupon, is shown in radial section. The disk rim 3 comprises two friction rings 4 and 5, which are connected to each other via a plurality of webs 6 extending between them. The nave 2 has on its outer circumference a supporting ring 7, which extends between the friction rings 4 and 5 in the radially inner-lying region of the disk rim 3. As can be seen from FIG. 1, there is a radial spacing between the supporting ring 7 and a corresponding recess 8 of the web 6, by which a radial freedom for compensating for the different thermal expansion of nave 2 and disk rim 3 is ensured. The direction of movement in expansion due to the effect of heat is indicated by the arrows 9.

FIG. 2 shows a section along the line II—II in FIG. 1. It can be seen from this representation that the supporting ring 7 has radial depressions 10 in the form of grooves extending in an axial direction, into which grooves the radially inner-lying sections 11 of webs 12 of the disk rim 3 engage. The radially inner limitation of the sections 11 is arranged at a certain distance, for example 3 mm, from the base of the depression 10, by which the radial freedom of the two parts with respect to each other is ensured. Seen in the direction of rotation of the brake disk 1, the inner section 11 of the webs 12 include surfaces 13, running in an axial direction, which bear against wall parts 14 of the grooves or depressions 10. A further web 6 is arranged in each case between two neighboring webs 12, so that a plurality of cooling channels 15 for the passage of air are formed between the webs 6 and 12. Just like the webs 12, the webs 6 have a radial spacing from the corresponding surface of the supporting ring 7. In FIG. 2, the respective representations of FIGS. 1, 3 and 4 are indicated by the lines I—I, III—III and IV—IV.

The nave 2 is produced as a cast part with the supporting ring 7 provided on its outer circumference, with the necessary strength being provided by use of a material such as gray cast iron having a tensile strength of at least 250 N/mm². The nave 2 is placed in the casting mold for the disk rim 3, and the casting of the disk rim 3 takes place by the so-called composite casting process, whereby material of the disk rim gets into the radial depressions 10 of the supporting ring 7 and consequently the supporting ring 7 and the webs 12 of the disk rim 3 engage in one another like teeth.

FIG. 3 is an enlarged sectional view taken along the line III—III in FIG. 2. The lower end of the radial depression 10 and the section 11 of the web 12 which extends into the depression 10 can be seen from this view. Reference numerals in FIG. 3 correspond to those of corresponding parts shown in FIG. 1 and FIG. 2.

Figure 4:
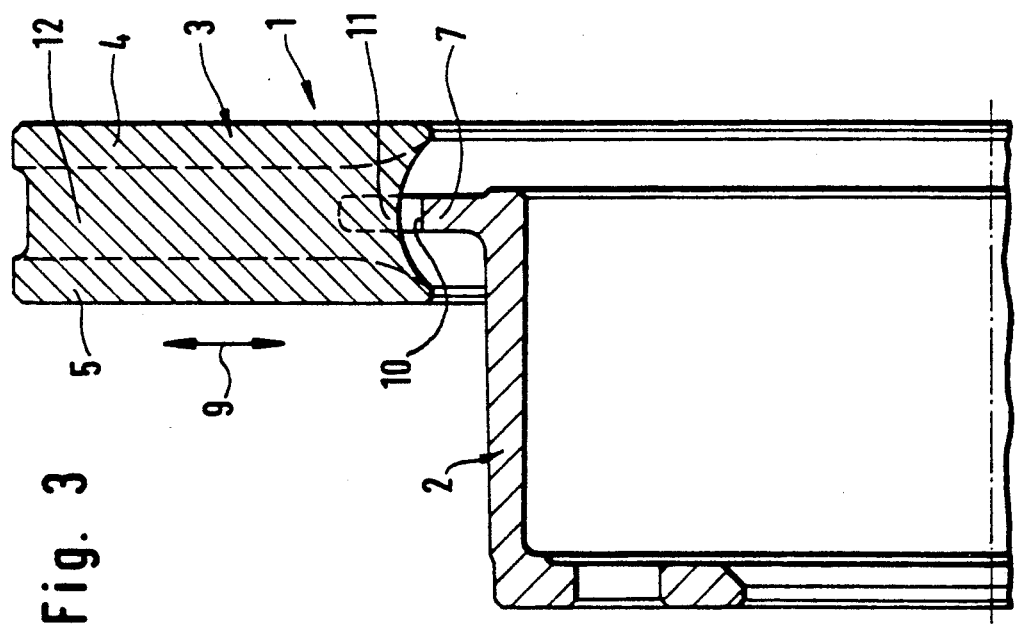
FIG. 4 comprises a section along the line IV—IV in FIG. 2.

FIG. 4 an enlarged sectional view similar to FIG. 3, but taken along the line IV—IV in FIG. 2. It is clear from this view that the supporting ring 7 extends a considerable distance into the intermediate space between the friction rings 4 and 5 of the disk rim 3. The web 6 has a recess 8, by which the radial freedom of the two parts with respect to each other is ensured. Laterally adjacent the supporting ring 7, the web 6 has flanking sections 16, which bear laterally against the supporting ring 7 to provide a fixing in the axial direction. Reference numerals used in FIG. 4 correspond to the numerals used in FIGS. 1 to 3.

What is claimed is:

1. A rotatable brake disk for disk brakes, in particular for motor vehicles, comprising
   a) a disk rim having two parallel friction rings which are connected by webs which, with respect to the axis of rotation of the brake disk, extend axially between the two friction rings and run radially in the direction of the outer edge of the brake disk, said webs having radially inner end sections;
   b) a nave having a supporting ring formed with radial grooves into which the radially inner end sections of said webs engage such that said webs and grooves establish a positive connection between the nave and the disk rim in the direction of rotation of the brake disk;
   the radially inner end section of said webs having inner end surfaces which are radially spaced via gaps from the bottoms of said grooves, whereby said webs are displaceable in said grooves in both radial directions in order to compensate for relative thermal expansions of said disk rim and nave.

2. The brake disk as claimed in claim 1, in which the radial spacing between the inner end surfaces of said webs and the bottoms of said grooves is approximately 3 mm.

3. The brake disk of claim 1, wherein there are twenty of said webs distributed uniformly around said supporting ring.

4. The brake disk as claimed in claim 1, further comprising additional radially extending webs which interconnect said parallel friction rings, said additional webs each having a recess at the radially inner end thereof into which said supporting ring extends, said recesses being defined by opposed walls which bear against adjacent and centiguous sides of the supporting ring in order to fix the disk rim on the supporting ring in the axial direction, said recesses having bottoms which are radially spaced form the outer surface of said supporting ring whereby said additional webs are displaceable on said supporting ring in both radial directions.

5. The brake disk as claimed in claim 4, in which said nave and disk rim are connected in the direction of rotation and thus torque only by the radially inner end sections of said first recited webs engaging in said grooves of the supporting ring, and are connected in the axial direction only by said opposed walls defining said recesses in said additional webs bearing against the continguous sides of the supporting ring.

6. The brake disk as claimed in claim 5, in which there is an additional web in each case between two of the first recited webs, and wherein all of the webs are distributed evenly over the inner surfaces of the two friction rings.

7. The brake disk as claimed in claim 1, in which the material of the nave has a higher tensile strength than the material of the disk rim, and the disk rim is fastened on the nave by composite casting.

8. A brake disk as claimed in claim 7, wherein the nave consists of a gray cast iron having a tensile strength of at least 250 N/mm² (GG 25).

9. A brake disk as claimed in claim 8, wherein the nave has a tensile strength of 300 N/mm² (GG 30).

10. A brake disk as claimed in claim 7, wherein the disk rim consists of gray cast iron having a high carbon content.

11. A brake disk as claimed in claim 10, wherein said disk rim has a tensile strength of 100 to 150 N/mm².

12. A brake disk as claimed in claim 7, wherein the nave consists of a gray cast iron with spheroidal graphite having a tensile strength of at least 400 N/mm$^2$ (GGG 40).

13. A brake disk as claimed in claim 7, wherein the nave consists of a sintered steel formed in a powder-metallurgical process.

14. A brake disk as claimed in claim 7, wherein the nave consists of a steel formed by one of deep drawing and flow forming.

* * * * *